United States Patent [19]

Wang

[11] Patent Number: 6,066,183
[45] Date of Patent: May 23, 2000

[54] LIQUID DISPERSED DYE OF THE AZO OR ANTHRAQUINONE TYPE

[75] Inventor: Kun-Chen Wang, Tainan, Taiwan

[73] Assignee: I-Hwa Industrial Co., Ltd.

[21] Appl. No.: 09/059,004

[22] Filed: Apr. 13, 1998

[51] Int. Cl.⁷ .................................................. C09B 67/40
[52] U.S. Cl. ......................... 8/560; 8/552; 8/576; 8/589; 516/77
[58] Field of Search ............................... 8/456, 527, 904, 8/552, 560, 576, 589; 516/77

[56] References Cited

U.S. PATENT DOCUMENTS

| | | | |
|---|---|---|---|
| 3,408,404 | 10/1968 | Vandenberg et al. | 516/77 X |
| 3,986,979 | 10/1976 | Moorer et al. | 516/77 |
| 4,063,880 | 12/1977 | Tullio | 8/527 |
| 4,094,634 | 6/1978 | Becker et al. | 8/527 |
| 4,153,414 | 5/1979 | Ver Nooy, III et al. | 8/527 X |
| 4,235,596 | 11/1980 | Schaub et al. | 8/456 |
| 4,281,999 | 8/1981 | Becker et al. | 8/527 |
| 4,439,206 | 3/1984 | Hildebrand et al. | 8/576 X |

*Primary Examiner*—Richard D. Lovering
*Attorney, Agent, or Firm*—Rosenberg, Klein & Bilker

[57] ABSTRACT

A liquid dispersed dye of the azo or anthraquinone type that includes a dispersing agent and dispersing assistant in order to keep the dye dissolved in liquid without sedimentation. The preferred dispersing agent is a sulfonated lignin salt and the preferred dispersing assistant is a surfactant such as polyethylene glycol epoxide ether (EO-1), polyethylene glycol phenolic-formaldehyde epoxide ether (EO-2), or polyethylene glycol amino methylene epoxide ether (EO-3).

2 Claims, No Drawings

LIQUID DISPERSED DYE OF THE AZO OR ANTHRAQUINONE TYPE

BACKGROUND OF THE INVENTION

This invention concerns liquid dispersed dyes of the azo and anthraquinone types, particularly non-soluble dyes mixed with a dispersing agent and a dispersing assistant in order to allow the non-soluble dye to dissolve or evenly disperse in the liquid, thus providing the dye with excellent thermal and storing stability. The liquid dispersed dye of the azo or anthraquinone type is capable of holding of a homogenous liquid phase to prevention of sedimentation.

Conventional dispersing dyes are generally found in dry powder form and must be weighed, added to water and stirred when it is to be used. In doing this, however, the powder may be spread or dispersed in the surrounding air in the process of pouring it into a container for dissolving, thus polluting the work environment. It is conceivable that workers may breathe in small amounts of the powder dye in spite of the fact that masks are worn under these handling conditions. Inhalation of these powder dyes for extended periods of time may cause occupational diseases such as coryza, catarrh, palmonary, bronchitis, etc.

Conventional dispersing assistants, when mixed with the powder dyes mentioned above, may be used to prevent dispersion in the air and the corresponding pollution. When mixed with water, these dyes dissolve to become solutions but when mixed with the conventional dispersing assistants, are found to have low dye solution concentration and high liability of sedimentation.

SUMMARY OF THE INVENTION

The object of the invention is to provide a liquid dispersed dye of the azo or anthraquinone type which contains a dispersing agent and dispersing assistant and which would have good solubility and high dispersion when dissolved while minimizing the danger of the powder dye being dispersed in the air while pouring and/or mixing the material. Furthermore, the compositions would have no tendency to sedimentation after having been dissolved in the liquid.

The main features of the invention are the use of a dispersing agent such as sulfonated lignin salt and a dispersing assistant as surfactant. This dispersing assistant would be a compound such as polyethylene glycol epoxide ether. The sulfonated lignin salt has chemical structural formula $(HOCH_3-OAR)_n(SO_3Na)_x$, wherein AR is an abbreviation for an aromatic system, with $1 \leq n \leq 30$ and $1 \leq x \leq 20$. For example, ligno S1 sulfonated lignin salt preferably has 10–80 weight percent, and the most preferably 15–75%, and the dispersing assistant may be EO-1, EO-2, or EO-3, which are polyethylene glycol epoxide ether, polyethylene glycol phenolic-formaldehyde epoxide ether, or polyethylene glycol amino ethylene epoxide ether, or the like such as octyl phenyl ether, phenol-formaldehyde, or amines. The number of epoxide groups included in the above-mentioned dispersing assistant is 2–30, its molecular weight being 150–5500, HLB (Hydrophile-Lipohile Balance Value) being 2–35. The quantity to be mixed in the dye is preferably 0.1–60 weight percent and most preferably 1–45 weight percent.

DETAILED DESCRIPTION OF THE PREFERRED EMBODIMENTS

The preferred embodiments of the liquid dispersed dye include a dye of the azo or anthraquinone type along with a dispersing agent and a dispersing assistant.

EXAMPLE 1

Disperse Orange 37, with a chemical formula of

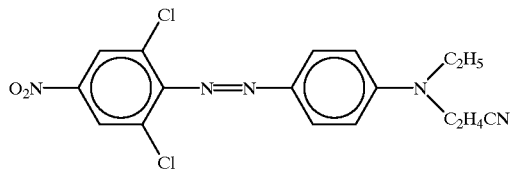

is a dye of the azo type. The dispersing agent(s) and dispersing assistant(s) were included in the experiments as shown Table I.

| | Composition | | | |
|---|---|---|---|---|
| Experiment | Lignos S1 W/W-Dry Cake | EO-1 W/W-Dry Cake | EO-2 W/W-Dry Cake | Naph S1 W/W-Dry Cake |
| 1 | 43% | 5% | 10% | |
| 2 | 43% | 15% | 20% | |
| 3 | 43% | 24% | 30% | |
| Comparable 1 | 50% | | | |
| Comparable 2 | 83.4% | | | |

Ligno S1 is sulfonated lignin salt (Dispersing Agent)
EO-1 is Polyethylene Glycol Epoxide Ether
EO-2 is Polyethylene Glycol Phenolic-Formaldehyde Epoxide Ether
Naph S1 is Sodium Naphthalene Sulfonate (Dispersing Agent)
Chemical formula: 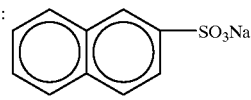

The dispersed dye composition was prepared by grinding the components for six hours in a vertical type grinder operating at 850 rpms utilizing a grinding medium of glass beads of 1±0.2 mm. The temperature of the liquid dye was maintained at 25±5° C. Observations were made on the degree of sedimentation and the effect of grinding and are shown in Tables II and III.

TABLE II

| | SEDIMENTATION* (%) | | |
|---|---|---|---|
| | 10 days | 20 days | 30 days |
| Experiment 1 | 1 | 4 | 6 |
| Experiment 2 | 1 | 2 | 4 |
| Experiment 3 | 1 | 2 | 4 |
| Comparable Experiment 1 | 10 | 26 | 46 |
| Comparable Experiment 2 | 15 | 39 | 57 |

*(Depth of clear upper layer/total depth) × 100%

TABLE III

| | DISPERSING FEATURE | |
|---|---|---|
| | 3 hours | 6 hours |
| Experiment 1 | 42 sec. | 15 sec. |
| Experiment 2 | 40 sec. | 15 sec. |
| Experiment 3 | 34 sec. | 13 sec. |

TABLE III-continued

DISPERSING FEATURE

|  | 3 hours | 6 hours |
|---|---|---|
| Comparable Experiment 1 | 95 sec. | 60 sec. |
| Comparable Experiment 2 | 89 sec. | 60 sec. |

*Dispersion measurements were made in accordance with AATCC Test method and procedures 146–1994, committee RA87; Test method: Dispersibility of Disperse Dyes (Filter Test) utilizing four grams of dye solution with 200 grams of softened water modified with 10% acetic acid to give a pH of 4.5 . 5.0 followed by heating to 71° C. The filter paper used was Whatman #2 over #4 and the vacuum filter pressure was 560 ± 10 mmHg and a solution filtering time of 0–24 seconds.

EXAMPLE 2

The dye used is Disperse Violet 93 which is a liquid dispersed dye of the azo type with a formula of:

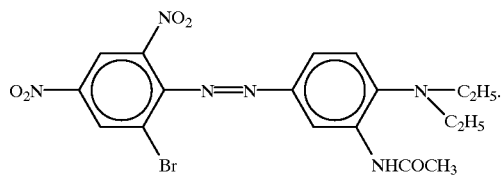

The dispersing agent(s) and dispersing assistants(s) were included in the experiments as shown in Table IV.

TABLE IV

|  | Composition | | | |
|---|---|---|---|---|
| Experiment | Lignos S1 W/W | EO-1 W/W | EO-2 W/W | Naph S1 W/W |
| 1 | 14.2% | 11.2% | 20% |  |
| 2 | 41.3% | 15% | 25% |  |
| 3 | 35% | 16% | 30% |  |
| 4 | 19% | 30% | 16% |  |
| Comparable 1 | 50% |  |  | 10% |
| Comparable 2 | 70% |  |  | 10% |

Ligno S1 is Sulfonated Lignin Salt (Dispersing Agent)
EO-1 is Polyethylene Glycol Epoxide Ether
EO-2 is Polyethylene Glycol Phenolic-Formaldehyde Epoxide Ether
Naph S1 is Sodium Naphthalene Sulfonate (Dispersing Agent)

The dispersed dye composition was prepared by grinding the components for 4–6 hours in a, vertical type grinder operating at 800 rpms utilizing a grinding medium of glass beads of 1±0.2 mm The temperature of the liquid dye was maintained at 25±5° C. Observations were made on the degree of sedimentation and the effect of grinding and are shown in Tables V and VI.

TABLE V

(SEDIMENTATION)

|  | 10 days | 20 days | 30 days |
|---|---|---|---|
| Experiment 1 | 2% | 3% | 5% |
| Experiment 2 | 3% | 5% | 7% |
| Experiment 3 | 2% | 4% | 6% |
| Experiment 4 | 2% | 4% | 6% |

TABLE V-continued

(SEDIMENTATION)

|  | 10 days | 20 days | 30 days |
|---|---|---|---|
| Comparable Experiment 1 | 12% | 28% | 49% |
| Comparable Experiment 2 | 18% | 36% | 58% |

TABLE VI

DISPERSING FEATURE

|  | 3 hours | 6 hours |
|---|---|---|
| Experiment 1 | 46 sec. | 15 sec. |
| Experiment 2 | 50 sec. | 15 sec. |
| Experiment 3 | 48 sec. | 13 sec. |
| Experiment 4 | 51 sec. | 13 sec. |
| Comparable Experiment 1 | >60 sec. | >30 sec. |
| Comparable Experiment 2 | >60 sec. | >30 sec. |

EXAMPLE 3

Disperse Yellow 54, with a chemical formula of

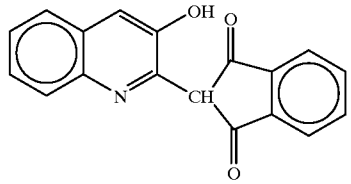

is a liquid dispersed dye of the anthraquinone type. The dispersing agent(s) and dispersing assistant(s) were included in the experiments as shown in Table VII.

TABLE VII

|  | Composition | | | |
|---|---|---|---|---|
| Experiment | Lignos S1 W/W | EO-1 W/W | EO-2 W/W | EO-3 W/W |
| 1 | 42% | 16.5% | 30% |  |
| 2 | 42% | 16.5% |  | 31% |
| 3 | 42% | 26.5% |  | 18% |
| 4 | 42% | 30% |  | 20% |
| Comparable 1 | 80% |  |  |  |
| Comparable 2 | 90% |  |  |  |

Ligno S1 is Sulfonated Lignin Salt (Dispersing Agent)
EO-1 is Polyethylene Glycol Epoxide Ether
EO-2 is Polyethylene Glycol Phenolic-Formaldehyde Epoxide Ether
EO-3 is Polyethylene Glycol Amino Methylene Epoxide Ether The dispersed dye composition was prepared by grinding the components for 4–10 hours in a vertical type grinder operating at 850 rpms utilizing a grinding medium of glass beads of 1±0.02 mm. The temperature of the liquid dye was maintained at 25±5° C. Observations were made on the degree of sedimentation and the effect of grinding and are shown in Tables VIII and IX.

TABLE VIII

(SEDIMENTATION)

|  | 10 days | 20 days | 30 days |
|---|---|---|---|
| Experiment 1 | 4% | 8% | 14% |
| Experiment 2 | 3% | 7% | 12% |
| Experiment 3 | 3% | 5% | 8% |
| Experiment 4 | 3% | 6% | 8% |
| Comparable Experiment 1 | 11% | 23% | 48% |
| Comparable Experiment 2 | 14% | 27% | 53% |

TABLE IX

DISPERSING FEATURE

|  | 2 hours | 4 hours | 6 hours |
|---|---|---|---|
| Experiment 1 | 45 sec. | 18 sec. | 9 sec. |
| Experiment 2 | 48 sec. | 19 sec. | 9 sec. |
| Experiment 3 | 36 sec. | 7 sec. |  |
| Experiment 4 | 35 sec. | 7 sec. |  |
| Comparable Experiment 1 | >50 sec. | >50 sec. | >30 sec. |
| Comparable Experiment 2 | >50 sec. | >50 sec. | >30 sec. |

The sulfonated lignin salt has a chemical structural formula $(HOCH_3-OAR)_n(SO_3Na)_x$, wherein AR is an abbreviation for an aromatic system, with $1 \leq n \leq 30$ and $1 \leq x \leq 20$. As an example, ligno S1 sulfonated lignin salt preferably is an amount range of 10–80 weight percent, and most preferably 15–75 weight percent. The dispersing assistant may be EO-1, EO-2, or EO-3, which are polyethylene glycol epoxide ether, polyethylene glycol phenolic-formaldehyde epoxide ether, or polyethylene glycol amino ethylene epoxide ether, or the like such as octyl phenyl ether, phenol-formaldehyde, or amines. The number of epoxide groups included in the above-mentioned dispersing assistant is 2–30, its molecular weight being 150–5500, HLB (Hydrophile-Lipohile Balance value) being 2–35. The quantity of the dispersing assistant to be mixed in the dye is preferably 0.1–60 weight percent and most preferably 1–45 weight percent.

What is claimed is:

1. A liquid dispersed dye of the azo or anthraquinone type comprising the dye component, a sulfonated lignin salt as a dispersing agent in an amount range of 10–80 weight percent, and a dispersing assistant selected from the group consisting of polyethylene glycol epoxide ether, polyethylene glycol phenolic-formaldehyde epoxide ether, and polyethylene glycol amino methylene epoxide, said dispersing assistant being in an amount range of 0.1–60 weight percent and having an epoxide number in a range of 2–30, a molecular weight in a range of 150–5500, and an HLB in a range of 2–35.

2. A liquid dispersed dye of the azo or anthraquinone type comprising the dye component, a sulfonated lignin salt as a dispersing agent in an amount range of 15–75 weight percent, and a dispersing assistant selected from the group consisting of polyethylene glycol epoxide ether, polyethylene glycol phenolic-formaldehyde epoxide ether, and polyethylene glycol amino methylene epoxide, said dispersing assistant being in an amount range of 0.1–60 weight percent and having an epoxide number in a range of 2–30, a molecular weight in a range of 150–5500, and an HLB in a range of 2–35.

* * * * *